Dec. 11, 1962 G. B. STRACCA 3,068,429

HYBRID CIRCUITS WITH COAXIAL TRANSMISSION LINES

Filed Nov. 13, 1958

United States Patent Office 3,068,429
Patented Dec. 11, 1962

3,068,429
HYBRID CIRCUITS WITH COAXIAL TRANSMISSION LINES

Giovanni Battista Stracca, Milan, Italy, assignor, by mesne assignments, to Marelli Lenkurt S.p.A., Milan, Italy, a company of Italy Filed Nov. 13, 1958, Ser. No. 773,779
Claims priority, application Italy Dec. 17, 1957
3 Claims. (Cl. 333—11)

The present invention relates to hybrid circuits and more particularly to hybrid circuits provided with the use of coaxial transmission lines.

The characteristics and the principle of operation of hybrid circuits are known in general in the field of microwaves. It is known that the power transmitted to any pair of a terminal of a quadribipole is divided into equal parts between two further pairs of terminals called adjacent terminals, while it does not appear in the remaining pair of terminals called opposed terminals. It is further known that in the domain of the lower frequencies of microwaves those circuits are embodied advantageously by means of coaxial lines since it is not convenient to use waveguides owing to the exceedingly large sizes the latter would have to assume in said range of frequencies.

Hybrid circuits with coaxial transmission lines such as for instance ring circuits as normally used, however, suffer the typical inconvenience of operating in theory on one frequency only and, in practice, within a narrow band of frequencies. Consequently, in practice, a substantial reduction of the effectiveness of said devices follows from said impossibility of being adapted to cover a wider frequency range.

It is an object of the present invention to obviate the aforesaid inconvenience by adapting a hybrid circuit in a coaxial transmission line for use with very large band.

According to the invention the covering of said elevated band is effected with the aid of a cavity resonator, in the interior whereof there is embodied the hybrid junction, for instance, by means of a resonating radial line to be tuned in a wide frequency range.

Due to its characteristics, the circuit according to the invention can be particularly utilized as a balanced receiving and transmitting converter.

In this particular application the resonator can serve as an antenna filter for the receiver if the signal coming from the antenna is made to pass therethrough, or as a band-pass filter for the heterodyne signal, if the oscillation coming from the local generator of the receiver is made to pass through the resonator.

In the first case it is possible to provide a very simple balanced converter incorporating the antenna filter; in the second case the resonator serves to filter the heterodyne signal, while the terminals at which the signal arrives accommodate a very wide band in practice.

The invention is hereinafter described in detail and is illustrated with reference to the accompanying drawing which shows in FIG. 1 the electric circuit diagram and, in FIG. 2, an embodiment for balanced converters.

Figure 1:
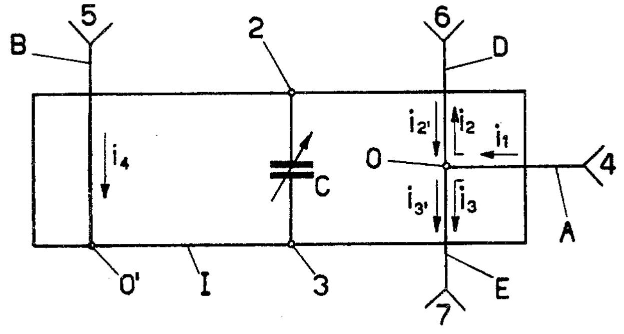

With reference to FIG. 1, with I is indicated the cavity resonator tuned by means of the variable capacity C with capacitor armature connected electrically at the central points 2 and 3 of the resonator.

The connections 4 and 5 relative to the branches A and B shown in the drawing respectively at the two sides of I, represent diagrammatically the two pairs of opposed terminals of the hybrid circuit, while the connections 6 and 7 relative to the branches D and F represent the two pairs of adjacent terminals.

The branch A is connected to the adjacent branches D and E in correspondence with the point O internal with respect to the cavity and symmetrical with respect thereto and to the connections. The loads connected to the branches D and E should obviously be equal and such as to afford an adaptation of impedance for the signal coming from the branch.

The branch is connected at O′ to the resonator. The position of the point O′ of course is to be determined with regard to the positions of the branches D and E and to the position of the tuning member C. This is in order to make sure that the power of the branch B should wholly be transferred to D and E, that is to say, that impedance adaptation should be effected in said branch.

In the operation of the device, the signal indicated by the current $i_1$, coming from the terminal 4, is divided into equal parts between the two adjacent branches D and E. With $i_2$ and $i_3$ are indicated the two equal component currents, which are opposed to each other and involve the aforesaid branches. Since $i_2$ and $i_3$ are equal to each other, but are in phase opposition, they cause no resultant field in the resonator and, therefore, zero current in the branch B. That is to say, the current $i_1$ causes a zero current in the branch B.

Analogously, the signal indicated by $i_4$ coming from the terminal 5 excites in the cavity an electromagnetic wave which causes the two currents $i'_2$ and $i'_3$ equal and in phase with each other in the two adjacent branches D and E. As a consequence, the resultant current in the branch A is nil.

The circuit according to the invention, therefore, achieves the characteristics of hybrid circuits.

In fact, the terminal 4 is uncoupled with respect to the opposed terminal 5 and the terminal 5 is uncoupled with respect to 4 while both the signal of the terminal 4 and the signal of the terminal 5 involve only the adjacent brances D and E.

Figure 2:
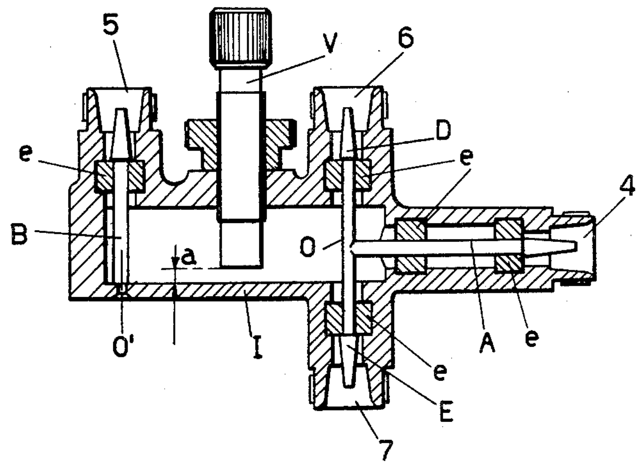

FIG. 2 represents a preferred embodiment (without limitation) of the invention. By the symbol I is indicated again the resonator obtained with a radial line; A and B indicate the opposed coaxial lines and D and E the adjacent coaxial lines.

The variable capacity in the resonator is obtained by acting upon the adjusting screw V. By rotating this screw in one direction or in the other, the distance $a$ between its inner end and the surface of the resonator is varied.

With $e$ are indicated centering washers for the coaxial branches.

If the circuit is used as a balanced converter, the terminal 4 is connected to the antenna, the terminals 6 and 7 respectively to two converter diodes and the terminal 5 to the local generator.

In this particular application it is obvious that the mounting of the diodes should be effected in such a manner as to afford the adaptation of impedance for the signal coming (when receiving) from the branch A.

Also the coupling of the branch B and of the two branches D and E from the radial cavity should be effected in such a manner as to get an adaptation of impedance between said branch B and the branches D and E, if they are loaded by the diodes, and in such a manner that the cavity should afford the desired band width.

The invention has been illustrated with reference to the drawings. However, it is clear that these are susceptible of variants and modifications according to the various requirements of applications in practice.

I claim:

1. A hybrid junction comprising resonant cavity means defining an axis of symmetry, tuning means on said resonant cavity means substantially at said axis, a coaxial line coupled to said resonant cavity means at the periphery thereof and arranged perpendicularly with respect to said axis, further coaxial lines on opposite sides of said resonant cavity means and coaxially aligned adjacent the first said line, and a fourth coaxial line parallel to said axis and on one side of said resonant cavity means and including an inner conductor connected to the opposite side of said resonant cavity means, said tuning means being located between said fourth and the other coaxial lines.

2. A hybrid junction as claimed in claim 1, wherein said tuning means is a capacitor including an armature controllably spaced from said opposite side of said resonant cavity means.

3. A hybrid junction as claimed in claim 1, wherein the first three said coaxial lines include inner conductors connected in a T-arrangement.

References Cited in the file of this patent

UNITED STATES PATENTS

| | | |
|---|---|---|
| 2,507,915 | Lindenblad | May 16, 1950 |
| 2,576,481 | Rodwin | Nov. 27, 1951 |
| 2,649,576 | Lewis | Aug. 18, 1953 |
| 2,795,763 | Tillotson | June 11, 1957 |
| 2,796,586 | Goldstein | June 18, 1957 |

OTHER REFERENCES

Germany, application Serial No. T7110, May 24, 1956